(12) United States Patent (10) Patent No.: US 8,073,860 B2
Venkataraman et al. (45) Date of Patent: Dec. 6, 2011

(54) METHOD AND SYSTEM FOR INCREMENTALLY SELECTING AND PROVIDING RELEVANT SEARCH ENGINES IN RESPONSE TO A USER QUERY

(75) Inventors: Sashikumar Venkataraman, Andover, MA (US); Rakesh Barve, Bangalore (IN); Pankaj Garg, Patiala (IN)

(73) Assignee: Veveo, Inc., Andover, MA (US)

( * ) Notice: Subject to any disclaimer, the term of this patent is extended or adjusted under 35 U.S.C. 154(b) by 592 days.

(21) Appl. No.: 12/018,566

(22) Filed: Jan. 23, 2008

(65) Prior Publication Data

US 2008/0114743 A1 May 15, 2008

Related U.S. Application Data

(63) Continuation-in-part of application No. 11/694,596, filed on Mar. 30, 2007.

(60) Provisional application No. 60/886,136, filed on Jan. 23, 2007, provisional application No. 60/787,412, filed on Mar. 30, 2006.

(51) Int. Cl.
*G06F 7/00* (2006.01)
*G06F 17/30* (2006.01)

(52) U.S. Cl. ............... 707/759; 707/769; 707/803

(58) Field of Classification Search ............... 707/759, 707/765, 767, 999.005, 769, 803
See application file for complete search history.

(56) References Cited

U.S. PATENT DOCUMENTS

| | | | |
|---|---|---|---|
| 1,261,167 A | 4/1918 | Russell | |
| 4,453,217 A | 6/1984 | Boivie | |
| 4,760,528 A | 7/1988 | Levin | |
| 4,797,855 A | 1/1989 | Duncan, IV et al. | |
| 4,893,238 A | 1/1990 | Venema | |
| 5,224,060 A | 6/1993 | Ma et al. | |
| 5,337,347 A | 8/1994 | Halstead-Nussloch et al. | |
| 5,369,605 A | 11/1994 | Parks | |
| 5,487,616 A | 1/1996 | Ichbiah | |
| 5,532,754 A | 7/1996 | Young et al. | |
| 5,623,406 A | 4/1997 | Ichbiah | |

(Continued)

FOREIGN PATENT DOCUMENTS

EP 181058 5/1986

(Continued)

OTHER PUBLICATIONS

European Search Report for 06838179.7, dated Dec. 9, 2009, 7 pages.

(Continued)

*Primary Examiner* — Phong Nguyen

(74) *Attorney, Agent, or Firm* — Wilmer Cutler Pickering Hale & Dorr LLP.

(57) ABSTRACT

Methods and systems for incrementally selecting and providing relevant search engines in response to a user query. A method of incrementally selecting and providing relevant search engines is based in part on identifying a set of search engines associated with corresponding metadata, receiving a partial search query entered by the user of a device, inferring after each user keypress a set of potential full queries intended by the user, using the potential full queries and the search engine metadata to identify a set of relevant search engines, and for each of these search engines, providing a direct link to launch a relevant query in the search engine. The user input may be either ambiguous, or erroneous, and may be entered using an input-constrained device.

20 Claims, 11 Drawing Sheets

U.S. PATENT DOCUMENTS

| | | | |
|---|---|---|---|
| 5,635,989 A | 6/1997 | Rothmuller | |
| 5,745,889 A | 4/1998 | Burrows | |
| 5,774,588 A | 6/1998 | Li | |
| 5,805,155 A | 9/1998 | Allibhoy et al. | |
| 5,818,437 A | 10/1998 | Grover et al. | |
| 5,828,420 A | 10/1998 | Marshall et al. | |
| 5,828,991 A | 10/1998 | Skiena et al. | |
| 5,835,087 A | 11/1998 | Herz et al. | |
| 5,859,662 A | 1/1999 | Cragun et al. | |
| 5,880,768 A | 3/1999 | Lemmons et al. | |
| 5,912,664 A | 6/1999 | Eick et al. | |
| 5,930,788 A | 7/1999 | Wical | |
| 5,937,422 A | 8/1999 | Nelson et al. | |
| 5,945,928 A | 8/1999 | Kushler et al. | |
| 5,945,987 A | 8/1999 | Dunn | |
| 5,953,541 A | 9/1999 | King et al. | |
| 6,005,565 A | 12/1999 | Legall et al. | |
| 6,005,597 A | 12/1999 | Barrett et al. | |
| 6,006,225 A | 12/1999 | Bowman et al. | |
| 6,009,459 A | 12/1999 | Belfiore et al. | |
| 6,011,554 A | 1/2000 | King et al. | |
| 6,047,300 A | 4/2000 | Walfish et al. | |
| 6,075,526 A | 6/2000 | Rothmuller | |
| 6,133,909 A | 10/2000 | Schein et al. | |
| 6,184,877 B1 | 2/2001 | Dodson et al. | |
| 6,189,002 B1 | 2/2001 | Roitblat | |
| 6,223,059 B1 | 4/2001 | Haestrup et al. | |
| 6,260,050 B1 | 7/2001 | Yost et al. | |
| 6,266,048 B1 | 7/2001 | Carau, Sr. | |
| 6,266,814 B1 | 7/2001 | Lemmons et al. | |
| 6,269,361 B1 | 7/2001 | Davis et al. | |
| 6,286,064 B1 | 9/2001 | King et al. | |
| 6,307,548 B1 | 10/2001 | Flinchem et al. | |
| 6,307,549 B1 | 10/2001 | King et al. | |
| 6,360,215 B1 | 3/2002 | Judd et al. | |
| 6,377,945 B1 | 4/2002 | Risvik | |
| 6,385,602 B1 | 5/2002 | Tso et al. | |
| 6,438,751 B1 | 8/2002 | Voyticky et al. | |
| 6,463,586 B1 | 10/2002 | Jerding | |
| 6,466,933 B1 | 10/2002 | Huang et al. | |
| 6,529,903 B2 | 3/2003 | Smith | |
| 6,564,213 B1 | 5/2003 | Ortega et al. | |
| 6,564,313 B1 | 5/2003 | Kashyap | |
| 6,594,657 B1 | 7/2003 | Livowsky | |
| 6,600,496 B1 | 7/2003 | Wagner et al. | |
| 6,614,455 B1 | 9/2003 | Cuijpers et al. | |
| 6,615,248 B1 | 9/2003 | Smith | |
| 6,631,496 B1 | 10/2003 | Li et al. | |
| 6,664,980 B2 | 12/2003 | Bryan et al. | |
| 6,721,954 B1 | 4/2004 | Nickum | |
| 6,732,369 B1 | 5/2004 | Schein et al. | |
| 6,757,906 B1 | 6/2004 | Look et al. | |
| 6,766,526 B1 | 7/2004 | Ellis | |
| 6,772,147 B2 | 8/2004 | Wang | |
| 6,785,671 B1 | 8/2004 | Bailey et al. | |
| 6,801,909 B2 | 10/2004 | Delgado et al. | |
| 6,839,702 B1 | 1/2005 | Patel et al. | |
| 6,839,705 B1 | 1/2005 | Grooters | |
| 6,850,693 B2 | 2/2005 | Young et al. | |
| 6,865,575 B1 | 3/2005 | Smith | |
| 6,865,746 B1 | 3/2005 | Herrington et al. | |
| 6,907,273 B1 | 6/2005 | Smethers | |
| 6,965,374 B2 | 11/2005 | Villet et al. | |
| 6,999,959 B1* | 2/2006 | Lawrence et al. | 707/999.005 |
| 7,013,304 B1 | 3/2006 | Schuetze et al. | |
| 7,117,207 B1 | 10/2006 | Kerschberg et al. | |
| 7,136,854 B2 | 11/2006 | Smith | |
| 7,149,983 B1 | 12/2006 | Robertson et al. | |
| 7,213,256 B1 | 5/2007 | Kikinis | |
| 7,225,180 B2 | 5/2007 | Donaldson et al. | |
| 7,225,184 B2 | 5/2007 | Carrasco et al. | |
| 7,225,455 B2 | 5/2007 | Bennington et al. | |
| 7,269,548 B2 | 9/2007 | Fux et al. | |
| 7,293,231 B1 | 11/2007 | Gunn et al. | |
| 7,509,313 B2* | 3/2009 | Colledge et al. | 707/999.005 |
| 7,529,744 B1* | 5/2009 | Srivastava et al. | 707/999.005 |
| 7,536,384 B2 | 5/2009 | Venkataraman et al. | |
| 7,539,676 B2 | 5/2009 | Aravamudan et al. | |
| 7,548,915 B2* | 6/2009 | Ramer et al. | 707/999.005 |
| 7,644,054 B2 | 1/2010 | Garg et al. | |
| 7,657,526 B2 | 2/2010 | Aravamudan et al. | |
| 7,779,011 B2 | 8/2010 | Venkataraman et al. | |
| 7,788,266 B2 | 8/2010 | Venkataraman et al. | |
| 2002/0002550 A1 | 1/2002 | Berman | |
| 2002/0042791 A1 | 4/2002 | Smith et al. | |
| 2002/0049752 A1 | 4/2002 | Bowman et al. | |
| 2002/0052873 A1 | 5/2002 | Delgado et al. | |
| 2002/0059621 A1 | 5/2002 | Thomas et al. | |
| 2002/0077143 A1 | 6/2002 | Sharif et al. | |
| 2002/0083448 A1 | 6/2002 | Johnson | |
| 2002/0133481 A1 | 9/2002 | Smith et al. | |
| 2002/0184373 A1 | 12/2002 | Maes | |
| 2002/0188488 A1 | 12/2002 | Hinkle | |
| 2002/0199194 A1 | 12/2002 | Ali | |
| 2003/0005452 A1 | 1/2003 | Rodriguez | |
| 2003/0005462 A1 | 1/2003 | Broadus et al. | |
| 2003/0011573 A1 | 1/2003 | Villet et al. | |
| 2003/0014399 A1* | 1/2003 | Hansen et al. | 707/3 |
| 2003/0014753 A1 | 1/2003 | Beach et al. | |
| 2003/0023976 A1 | 1/2003 | Kamen et al. | |
| 2003/0033292 A1 | 2/2003 | Meisel et al. | |
| 2003/0037043 A1 | 2/2003 | Chang et al. | |
| 2003/0046698 A1 | 3/2003 | Kamen et al. | |
| 2003/0066079 A1 | 4/2003 | Suga | |
| 2003/0084270 A1 | 5/2003 | Coon et al. | |
| 2003/0226146 A1 | 12/2003 | Thurston et al. | |
| 2003/0237096 A1 | 12/2003 | Barrett et al. | |
| 2004/0021691 A1 | 2/2004 | Dostie et al. | |
| 2004/0046744 A1 | 3/2004 | Rafii et al. | |
| 2004/0049783 A1 | 3/2004 | Lemmons et al. | |
| 2004/0073926 A1 | 4/2004 | Nakamura et al. | |
| 2004/0078815 A1 | 4/2004 | Lemmons et al. | |
| 2004/0078816 A1 | 4/2004 | Johnson | |
| 2004/0078820 A1 | 4/2004 | Nickum | |
| 2004/0083198 A1 | 4/2004 | Bradford et al. | |
| 2004/0093616 A1 | 5/2004 | Johnson | |
| 2004/0111745 A1 | 6/2004 | Schein et al. | |
| 2004/0128686 A1 | 7/2004 | Boyer et al. | |
| 2004/0139091 A1 | 7/2004 | Shin | |
| 2004/0143569 A1 | 7/2004 | Gross et al. | |
| 2004/0155908 A1 | 8/2004 | Wagner | |
| 2004/0194141 A1 | 9/2004 | Sanders | |
| 2004/0216160 A1 | 10/2004 | Lemmons et al. | |
| 2004/0220926 A1 | 11/2004 | Lamkin et al. | |
| 2004/0221308 A1 | 11/2004 | Cuttner et al. | |
| 2004/0261021 A1 | 12/2004 | Mittal et al. | |
| 2005/0015366 A1 | 1/2005 | Carrasco et al. | |
| 2005/0038702 A1 | 2/2005 | Merriman et al. | |
| 2005/0071874 A1 | 3/2005 | Elcock et al. | |
| 2005/0086234 A1 | 4/2005 | Tosey | |
| 2005/0086691 A1 | 4/2005 | Dudkiewicz et al. | |
| 2005/0086692 A1 | 4/2005 | Dudkiewicz et al. | |
| 2005/0174333 A1 | 8/2005 | Robinson et al. | |
| 2005/0192944 A1 | 9/2005 | Flinchem | |
| 2005/0210020 A1 | 9/2005 | Gunn et al. | |
| 2005/0210383 A1 | 9/2005 | Cucerzan et al. | |
| 2005/0210402 A1 | 9/2005 | Gunn et al. | |
| 2005/0223308 A1 | 10/2005 | Gunn et al. | |
| 2005/0240580 A1 | 10/2005 | Zamir et al. | |
| 2005/0246311 A1 | 11/2005 | Whelan et al. | |
| 2005/0246324 A1 | 11/2005 | Paalasmaa et al. | |
| 2005/0278175 A1 | 12/2005 | Hyvonen | |
| 2005/0283468 A1* | 12/2005 | Kamvar et al. | 707/3 |
| 2006/0010477 A1 | 1/2006 | Yu | |
| 2006/0013487 A1 | 1/2006 | Longe et al. |  |
| 2006/0015906 A1 | 1/2006 | Boyer et al. | |
| 2006/0036640 A1 | 2/2006 | Tateno et al. | |
| 2006/0059044 A1 | 3/2006 | Chan et al. | |
| 2006/0069616 A1 | 3/2006 | Bau | |
| 2006/0075429 A1 | 4/2006 | Istvan et al. | |
| 2006/0090182 A1 | 4/2006 | Horowitz et al. | |
| 2006/0090185 A1 | 4/2006 | Zito et al. | |
| 2006/0090812 A1 | 5/2006 | Summerville | |
| 2006/0101499 A1 | 5/2006 | Aravamudan et al. | |
| 2006/0101503 A1 | 5/2006 | Venkataraman | |
| 2006/0101504 A1 | 5/2006 | Aravamudan et al. | |
| 2006/0112162 A1 | 5/2006 | Marot et al. | |

| | | | |
|---|---|---|---|
| 2006/0117019 A1 | 6/2006 | Sylthe et al. | |
| 2006/0161520 A1* | 7/2006 | Brewer et al. | 707/3 |
| 2006/0163337 A1 | 7/2006 | Unruh | |
| 2006/0167676 A1 | 7/2006 | Plumb | |
| 2006/0167859 A1 | 7/2006 | Verbeck Sibley et al. | |
| 2006/0173818 A1 | 8/2006 | Berstis et al. | |
| 2006/0190308 A1 | 8/2006 | Janssens et al. | |
| 2006/0195435 A1 | 8/2006 | Laird-McConnell et al. | |
| 2006/0206454 A1* | 9/2006 | Forstall et al. | 707/3 |
| 2006/0248078 A1* | 11/2006 | Gross et al. | 707/5 |
| 2006/0256078 A1 | 11/2006 | Flinchem et al. | |
| 2006/0259479 A1* | 11/2006 | Dai | 707/4 |
| 2006/0274051 A1 | 12/2006 | Longe et al. | |
| 2007/0005563 A1 | 1/2007 | Aravamudan | |
| 2007/0016476 A1 | 1/2007 | Hoffberg et al. | |
| 2007/0027852 A1 | 2/2007 | Howard et al. | |
| 2007/0043750 A1 | 2/2007 | Dingle | |
| 2007/0050337 A1 | 3/2007 | Venkataraman et al. | |
| 2007/0050348 A1 | 3/2007 | Aharoni et al. | |
| 2007/0061244 A1 | 3/2007 | Ramer et al. | |
| 2007/0061317 A1 | 3/2007 | Ramer et al. | |
| 2007/0061321 A1 | 3/2007 | Venkataraman | |
| 2007/0061754 A1 | 3/2007 | Ardhanari et al. | |
| 2007/0067272 A1 | 3/2007 | Flynt et al. | |
| 2007/0088681 A1 | 4/2007 | Aravamudan et al. | |
| 2007/0100650 A1 | 5/2007 | Ramer et al. | |
| 2007/0130128 A1 | 6/2007 | Garg et al. | |
| 2007/0143567 A1 | 6/2007 | Gorobets | |
| 2007/0150606 A1 | 6/2007 | Flinchem et al. | |
| 2007/0219984 A1 | 9/2007 | Aravamudan et al. | |
| 2007/0219985 A1 | 9/2007 | Aravamudan et al. | |
| 2007/0239682 A1* | 10/2007 | Arellanes et al. | 707/3 |
| 2007/0255693 A1 | 11/2007 | Ramaswamy et al. | |
| 2007/0260703 A1 | 11/2007 | Ardhanari et al. | |
| 2007/0266021 A1 | 11/2007 | Aravamudan et al. | |
| 2007/0266026 A1 | 11/2007 | Aravamudan et al. | |
| 2007/0266406 A1 | 11/2007 | Aravamudan et al. | |
| 2007/0271205 A1 | 11/2007 | Aravamudan et al. | |
| 2007/0276773 A1 | 11/2007 | Aravamudan et al. | |
| 2007/0276821 A1 | 11/2007 | Aravamudan et al. | |
| 2007/0276859 A1 | 11/2007 | Aravamudan et al. | |
| 2007/0288456 A1 | 12/2007 | Aravamudan et al. | |
| 2007/0288457 A1 | 12/2007 | Aravamudan et al. | |
| 2008/0021884 A1* | 1/2008 | Jones et al. | 707/3 |
| 2008/0065617 A1* | 3/2008 | Burke et al. | 707/5 |
| 2008/0071771 A1 | 3/2008 | Venkataraman et al. | |
| 2008/0077577 A1* | 3/2008 | Byrne et al. | 707/5 |
| 2008/0086704 A1 | 4/2008 | Aravamudan | |
| 2008/0114743 A1 | 5/2008 | Venkataraman et al. | |
| 2008/0177717 A1* | 7/2008 | Kumar et al. | 707/4 |
| 2008/0195601 A1* | 8/2008 | Ntoulas et al. | 707/5 |
| 2008/0209229 A1 | 8/2008 | Ramakrishnan et al. | |
| 2008/0313564 A1 | 12/2008 | Barve et al. | |
| 2009/0198688 A1 | 8/2009 | Venkataraman et al. | |
| 2010/0121845 A1 | 5/2010 | Aravamudan et al. | |
| 2010/0153380 A1 | 6/2010 | Garg et al. | |

FOREIGN PATENT DOCUMENTS

| | | |
|---|---|---|
| EP | 1050794 A | 11/2000 |
| EP | 1143691 | 10/2001 |
| EP | 1338967 | 8/2003 |
| EP | 1463307 A | 9/2004 |
| EP | 1622054 | 2/2006 |
| WO | WO-98/56173 | 12/1998 |
| WO | WO-00/70505 A1 | 11/2000 |
| WO | WO-2004/010326 | 1/2004 |
| WO | WO-2004/031931 A1 | 4/2004 |
| WO | WO-2005/033967 A3 | 4/2005 |
| WO | WO-2005/084235 A2 | 9/2005 |
| WO | WO-2006/052959 | 5/2006 |
| WO | WO-2006/052966 | 5/2006 |
| WO | WO-2007/025148 | 3/2007 |
| WO | WO-2007/025149 | 3/2007 |
| WO | WO-2007/062035 | 5/2007 |
| WO | WO-2007/118038 | 10/2007 |
| WO | WO-2007/124429 | 11/2007 |
| WO | WO-2007/124436 A2 | 11/2007 |
| WO | WO-2007/131058 | 11/2007 |
| WO | WO-2008/034057 | 3/2008 |
| WO | WO-2008/091941 | 7/2008 |
| WO | WO-2008/148012 | 12/2008 |

OTHER PUBLICATIONS

Nardi, et al., "Integrating Communication and Information Through Contact Map," Communications of the ACM, vol. 45, No. 4, Apr. 2002, 7 pages, retrieved from URL:http://portal.acm.org/citation. cfm?id+505251>.

Supplemental European Search Report for EP 07761026.9 dated Jan. 28, 2010, 8 pages.

Turski, et al., "Inner Circle—People Centered Email Client," CHI 2005 Conference on Human Factors in Computing Systems, Apr. 2005, pp. 1845-1848, retrieved from URL:http://portal.acm.org/citation.cfm?id+1056808.1057037.

Ardissono, L. et al., User Modeling and Recommendation Techniques for Personalized Electronic Program Guides, Personalized Digital Television, Editors: Ardissono, et al., Kluwer Academic Press, 2004.

Dalianis, "Improving search engine retrieval using a compound splitter for Swedish," Abstract of presentation at Nodalida 2005—15th Nordic Conference on Computational Linguistics, Joensuu Finland, May 21-22, 2005. Retrieved Jan. 5, 2006 from http://phon.joensuu. fi/nodalida/abstracts/03.shtml.

Digital Video Broadcasting, http://www.dvb.org (Oct. 12, 2007).

Gadd, Phonix: The Algorith, Program, vol. 24(4), Oct. 1990 (pp. 363-369).

Good, N. et al., Combining Collaborative Filtering with Personal Agents for Better Recommendations, in Proc. of the 16th National Conference on Artificial Intelligence, pp. 439-446, Orlando, Florida, Jul. 18-22, 1999.

International Search Report and Written Opinion, International Patent Application No. PCT/US08/51789, mailed Jul. 14, 2008 (7 Pages).

MacKenzie et al., LetterWise: Prefix-based disambiguation for mobile text input, Proceedings of the ACM Symposium on User Interface Software and Technology—UIST2001, pp. 111-120.

Matthom, "Text Highlighting in Search Results", Jul. 22, 2005. Available at www.matthom.com/archive/2005/07/22/text-highlighting-in-search-results; retrieved Jun. 23, 2006. (4 pages).

Mokotoff, Soundexing and Genealogy, Available at http://www. avotaynu.com/soundex.html, retrieved Mar. 19, 2008, last updated Sep. 8, 2007 (6 pages).

Press Release from Tegic Communications, Tegic Communications is awarded patent for Japanese T9(R) text input software from the Japan Patent Office, Oct. 12, 2004. Retrieved Nov. 18, 2005 from http://www.tegic.com/press_view.html?release_num=55254242.

Review of Personalization Technologies: Collaborative Filtering vs. ChoiceStream's Attributized Bayesian Choice Modeling, Technology Brief, ChoiceStream Technologies, Cambridge, MA. (Feb. 4, 2004).

Silfverberg et al., Predicting text entry speed on mobile phones, Proceedings of the ACM Conference on Human Factors in Computing System—Chi, 2000. pp. 1-16.

Talbot, David. "Soul of a New Mobile Machine." *Technology Review: The Design Issue* May/Jun. 2007. (pp. 46, 48-50, 52-53).

Wikipedia's entry for Levenshtein distance (n.d.). Retrieved Nov. 15, 2006 from http://en.wikipedia.org/wiki/Levenshtein_distance.

Supp. European Search Report for PCT/US2005040415 dated Aug. 11, 2009, 15 pages.

Supp. European Search Report for PCT/US2005040424 dated Aug. 20, 2009, 13 pages.

International Search Report and Written Opinion of the International Searching Authority of the United States Patent and Trademark Office for PCT/US2005/040415, dated Nov. 27, 2006, 4 pages.

International Search Report and Written Opinion of the International Searching Authority of the United States Patent and Trademark Office for PCT/US2006/033257, dated Mar. 26, 2008, 5 pages.

International Search Report and Written Opinion of the International Searching Authority of the United States Patent and Trademark Office for PCT/US2006/045053, dated Jul. 24, 2008, 8 pages.

International Search Report and Written Opinion of the International Searching Authority of the United States Patent and Trademark Office for PCT/US2006/33258, dated Mar. 26, 2008, 5 pages.

International Search Report and Written Opinion of the International Searching Authority of the United States Patent and Trademark Office for PCT/US2007/067114, dated Jul. 2, 2008, 4 pages.

International Search Report and Written Opinion of the International Searching Authority of the United States Patent and Trademark Office for PCT/US2007/068064, 9 pages, dated Jul. 7, 2008.

International Search Report and Written Opinion of the International Searching Authority of the United States Patent and Trademark Office for PCT/US2007/078490, 4 pages, dated Jul. 3, 2008.

International Search Report and Written Opinion of the International Searching Authority of the United States Patent and Trademark Office for PCT/US2008/051789, dated Jul. 14, 2008, 5 pages.

International Search Report and Written Opinion of the International Searching Authority of the United States Patent and Trademark Office for PCT/US2008/064730, dated Sep. 8, 2008, 5 pages.

International Search Report and Written Opinion of the International Searching Authority, the United States Patent and Trademark Office, dated Jan. 25, 2008, for PCT/US2007/065703, 4 pages.

International Search Report and Written Opinion of the International Searching Authority, the United States Patent and Trademark Office, for International Application No. PCT/US05/40424, dated Nov. 21, 2006, 6 pages.

International Search Report and Written Opinion of the International Searching Authority, the United States Patent and Trademark Office, for International Application No. PCT/US07/67100, mailed Mar. 7, 2008, 5 pages.

Roe, et al., "Mapping UML Models Incorporating OCL Constraints into Object-Z," Technical Report, Sep. 2003, Department of Computing, Imperial College London, retrieved on Jul. 12, 2007, retrieved from the internet: <URL: http://www.doc.ic.ac.uk/-ar3/TechnicalReport2003_9.pdf>, 17 pages.

Supplementary European Search Report and Written Opinion for European Patent Application No. 07842499, dated Aug. 26, 2010, 6 pages.

* cited by examiner

METHOD AND SYSTEM FOR INCREMENTALLY SELECTING AND PROVIDING RELEVANT SEARCH ENGINES IN RESPONSE TO A USER QUERY

CROSS-REFERENCE TO RELATED APPLICATIONS

This application is a continuation-in-part of and claims priority under 35 U.S.C. §120 to U.S. patent application Ser. No. 11/694,596 filed on Mar. 30, 2007, entitled User Interface Method and System for Incrementally Searching and Selecting Content Items and for Presenting Advertising in Response to Search Activities, which claims priority under 35 U.S.C. §119(e) to U.S. Provisional Application No. 60/787,412 filed on Mar. 30, 2006, entitled Method and System for Advertising in Systems Supporting Incremental Search, both of which are incorporated herein by reference in their entirety.

This application claims priority under 35 U.S.C. §119(e) to U.S. Provisional Application No. 60/886,136 filed on Jan. 23, 2007, entitled Methods and Systems for Finding Desired Search Results and Predicting Ideal Search Engines Based on Partial Text Query Input, which is incorporated herein by reference in its entirety.

BACKGROUND

1. Field of the Invention

The invention generally relates to providing relevant search results using incremental search with minimal text entry, and more specifically to incrementally selecting and providing relevant search engines in response to a user query.

2. Discussion of Related Art

On devices with overloaded keyboards, such as portable phones, it is inconvenient to type an entire search query before obtaining results.

One new development in search engine technology intended to address this issue is the method of incremental search with minimal text entry. In systems incorporating incremental search with minimal text entry, search results are returned as text is entered. Each time the user enters or deletes a character, a new search is conducted using the partial search string entered. Depending on the efficiency of the search algorithm, the results expected by the user are displayed even before a full word of text is entered. Therefore, the user need not enter all the characters in the keyword he has in mind in order to obtain the results corresponding to the keyword.

For example, in order to obtain the results for "pizza" using incremental search, the user is not required to first enter the entire word "pizza" and then request a search. As soon as the user enters the character "p," results based on the partial search query are returned. Once the user enters the character "i," a new search is performed and the result set is narrowed. If the user sees the results for "pizza" among the set returned after entering "pi", he selects the result immediately without entering any more characters.

Incremental search with minimal text entry is particularly useful on input-constrained devices. However, it may also be used on systems with full-size keyboards, in order to reduce the effort required to obtain the required results. The data space on which the search is performed can be either from a single domain (for example, only entertainment content) or from multiple domains (for example, entertainment content, phone directories, stock quotes, etc). There are many variations of the minimal text entry methodology depending on the specialized data domains in which the search is performed. For example, in data domains that require entry of names of people, the initials of the person concerned could be a valid search. Partial prefixes of the components of the names of persons or titles of movies or books could be also used.

Another way to minimize the required amount of text entry is by using a query-completion system. For example, browsers designed for mobile phones, including third-party browsers such as the Opera mini Browser as well as proprietary phone browsers, provide text composition capabilities for typing text into webpage fields. When the webpage field is a search field, these capabilities can aid query composition on overloaded keypads such as the numeric keypads on phones.

Browsers can aid in query composition using a variety of methods. They can provide a menu of previous search queries entered, so the user can select the appropriate query as desired. The browser can also invoke the phone's text editing facilities (which a user invokes while typing in messages, for instance) such as the T9 dictionary mode or the multiple-tap keystroke disambiguation mode found commonplace on numeric keypads of phones. When a phone browser uses text composition capabilities such as the T9 system, the refinement and selection states are often combined: the user gets the next refinement choice being offered by the system only when s/he tabs to pass a previous refinement being offered by the system.

Google Suggest is another system designed to construct search queries predictively, based on a partial query typed by the user. As the user types his query, the Google Suggest system allows the user to refine the query string by providing up to ten possible query refinement choices. The partial query that has been entered by the user is always a strict prefix of each of the refinement choices offered by Google Suggest. At every refinement point, the user can either select the choice (using a Mouse Left Click or Enter Key while Mouse focus is on that choice) to launch the exact choice in the Google Web Search Engine. Alternatively, the user can use the choice as an incremental refinement in the query by using the Mouse Right Click while focus is on that choice and continue to add more input to the query. At any point the user can hit Enter to pass the current contents of the text field to the Google search engine, or left-click one of the other links for "Images", "Maps", "Videos" to launch the same query in any one of these specific search engines of Google. However, at no point during the query refinement process does the Google Suggest system offer query-specific links; only query refinements are provided.

SUMMARY OF THE INVENTION

This application provides methods and systems for incrementally selecting and providing relevant search engines in response to a user query.

Under one aspect of the invention, a method of incrementally selecting and providing relevant search engines includes identifying a set of search engines associated with corresponding metadata, receiving a partial search query entered by the user of a device, inferring after each user keypress a set of potential full queries intended by the user, using the potential full queries and the search engine metadata to identify a set of relevant search engines, and for each of these search engines, providing a direct link to launch a relevant query in the search engine.

Under another aspect of the invention, at least one of the inferred potential full queries is presented to the user.

Under another aspect of the invention, at least one of the fully qualified search engine links is presented to the user.

Under another aspect of the invention, the potential full queries are ranked according to their estimated relevance.

Under another aspect of the invention, the potential full queries are determined according to learned user preferences.

Under another aspect of the invention, the relevant search engines are selected using a metadata-matching technique.

Under another aspect of the invention, the partial query entered by the user is comprised of ambiguous text entered on an input-constrained keypad.

Under another aspect of the invention, the search logic corrects for erroneous input by the user.

BRIEF DESCRIPTION OF THE SEVERAL VIEWS OF THE DRAWINGS

For a more complete understanding of various embodiments of the present invention, reference is now made to the following descriptions taken in connection with the accompanying drawings, in which.

DETAILED DESCRIPTION

Introduction

Figure 1:
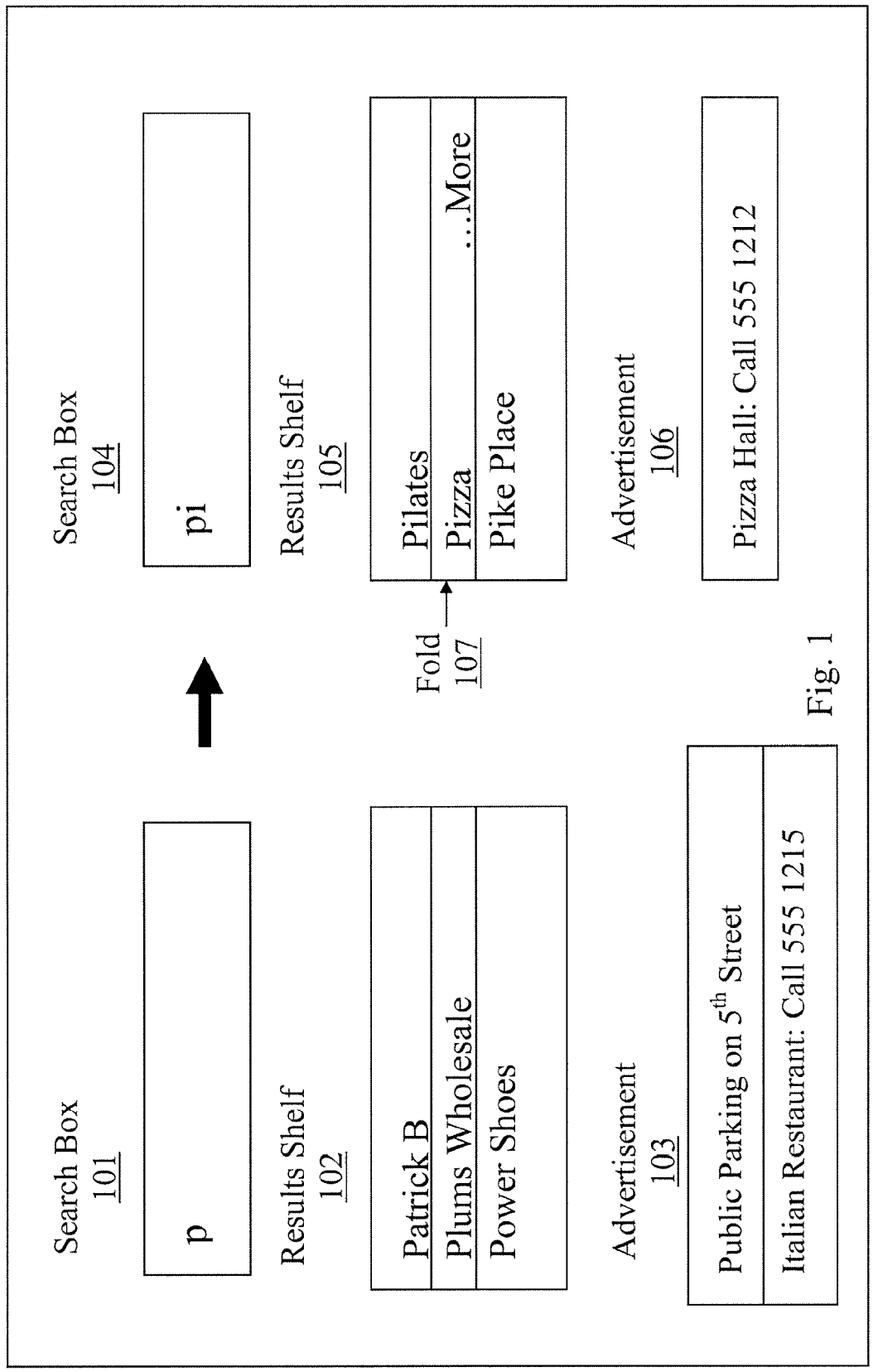
FIG. 1 illustrates a search system employing incremental search with minimal text entry.

Preferred embodiments of the present invention provide a search system that incrementally provides information and suggestions based on minimal text input. While the user types a query into a graphical search box, the system provides suggested query refinements, commercial advertisements and informational links selected according to the user's partial query. The system may also provide information about what search engines are likely to be relevant to the query the user is attempting to enter, allowing the user to launch the desired query directly in a selected search engine without embarking on a results-fetching phase. If the user does not select any of the suggested links or search engines, he will have the option to launch the finished query in a "default" search engine.

Preferred embodiments of the invention also enable a user to perform searches using incomplete and/or incorrect input on an unambiguous or an ambiguous keypad. Minimal text entry is especially useful for applications running on input-constrained devices, such as mobile phones, PDAs, and remote controls. However, the disclosed techniques may also be used to provide incremental search results on laptops, desktop PCs, and other devices with full-size keyboards.

Related Methods and Techniques

Embodiments of the present invention build on techniques, systems and methods disclosed in earlier filed applications, including but not limited to U.S. patent application Ser. No. 11/136,261, entitled Method and System For Performing Searches For Television Programming Using Reduced Text Input, filed on May 24, 2005, U.S. patent application Ser. No. 11/246,432, entitled Method And System For Incremental Search With Reduced Text Entry Where The Relevance Of Results Is A Dynamically Computed Function of User Input Search String Character Count, filed on Oct. 7, 2005, U.S. patent application Ser. No. 11/235,928, entitled Method and System For Processing Ambiguous, Multiterm Search Queries, filed on Sep. 27, 2005, U.S. patent application Ser. No. 11/509,909, entitled User Interface For Visual Cooperation Between Text Input And Display Device, filed Aug. 25, 2006, U.S. patent application Ser. No. 11/682,693, entitled Methods and Systems For Selecting and Presenting Content Based On Learned Periodicity Of User Content Selection, filed on Mar. 6, 2007, and U.S. patent application Ser. No. 11/561,197, entitled System And Method For Finding Desired Results By Incremental Search Using An Ambiguous Keypad With The Input Containing Orthographic And Typographic Errors, filed on Nov. 17, 2006, the contents of which are hereby incorporated by reference.

Those applications taught specific ways to perform incremental searches using ambiguous text input, methods of ordering the search results, and techniques for learning a user's behavior and preferences. Those techniques can be used with the sets of advertisements described herein in the same or similar ways in which the techniques are applied to the collections of content items described in those applications. In such a case, the advertisements described herein represent a particular type of content item. The present techniques, however, are not limited to systems and methods disclosed in the incorporated patent applications. Thus, while reference to such systems and applications may be helpful, it is not believed necessary to understand the present embodiments or inventions.

Incremental Search Results and Advertisements

FIG. 1 illustrates one possible manifestation of incremental search. In systems incorporating incremental search with minimal text entry, text is entered in a dedicated Search Box 101. Results corresponding to the search are displayed in a Results Shelf 102 ordered according to some criteria of relevance. There are one or more dedicated spaces for Advertisements 103. The positioning of Advertisements 103 can be anywhere relative to the Results Shelf 102, such as adjacent, directly above, directly below, set-apart, etc. There can also be multiple slots for advertisements in the Advertisement space as illustrated in 103. Users can select an advertisement to trigger additional action such as seeing more information about the advertisement, view a video, call a phone number, etc.

With every incremental character entered in the Search Box, as seen in 104 compared to 101, a new search is conducted using the search string entered so far including the just-entered character and the results corresponding to the current string in the Search Box 104 are returned in the Results Shelf 105. Results in the Results Shelf 105 can also be a Fold 107, where the entry has a descriptive title (called a "label") and stands for a collection of related items which can be accessed by selecting the Fold 107. Selecting a Fold is called "entering the Fold" or "descending the Fold", while using any of the available navigation mechanisms to get out of the Fold and go back to the state before entering the Fold is called "exiting the Fold". When the user has entered the Fold, he is said to be "within a Fold".

Figure 2:
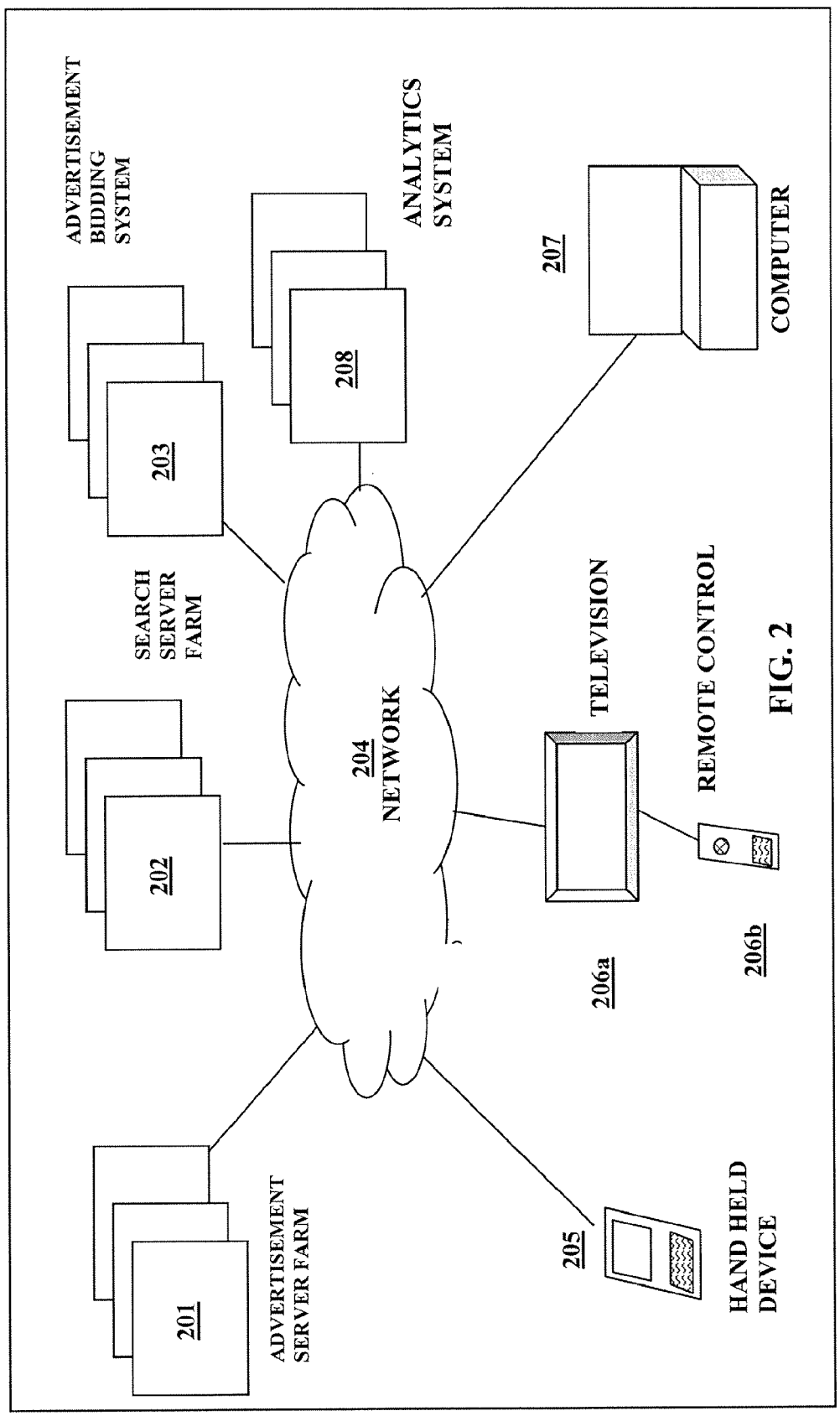
FIG. 2 illustrates an advertisement system in accordance with one or more embodiments of the invention being used in a different range of device and network configurations.

FIG. 2 illustrates an overall system for providing advertisements along with search results in systems supporting incremental searches using a wide range of devices in accordance with one or more embodiments of the invention. An Advertisement Server Farm 201 can serve as the source of advertisements to be served. A Search Server Farm 202 can serve as the source of search data and relevance updates with a network 204 functioning as the distribution framework.

A Network 204 serves as the distribution framework. The distribution framework can be a combination of wired and wireless connections. Examples of possible networks include cable television networks, satellite television networks, IP-based television networks, wireless CDMA and GSM networks. The search devices can have a wide range of interface capabilities such as a hand-held device 205 (e.g., a phone or PDA) with limited display size and a reduced keypad, a television 206a coupled with a remote control device 206b having a keypad, or a Personal Computer (PC) 207 with either a full keyboard or a reduced keyboard and a computer display.

An Advertisement Bidding System 203 enables advertisers to bid for advertisement slots. Advertisers or their agents place bids not only for full words, such as "pizza", but also for partial prefixes of words, such as, in the case of pizza, "p", "pi", "piz", or "pizz". Likewise, systems and methods described in the incorporated U.S. patent application Ser. No. 11/235,928, entitled Method and System For Processing Ambiguous, Multiterm Search Queries and U.S. patent application Ser. No. 11/509,909, entitled User Interface For Visual Cooperation Between Text Input And Display Device, can be used with the techniques described herein. Those applications taught systems where codes can be entered for words, for example, when the number on the numeric key on which a given alphabet is printed in a telephone keypad are used to stand for the alphabet itself. When used with those types of systems, bids using numbers can be used to stand for the corresponding characters. For example, "7", "74", and "749" can be used to stand for "p", "pi", "piz" respectively when the input device is a telephone keypad. For each search, the bid that is evaluated to be the one that is expected to generate the maximum economic utility to the entity supplying the search service is considered the winning bid. The corresponding advertisement is served by the Ad Server system 201 for display to the user in Advertisement space 103. This will be described in more detail below.

This invention also provides for an Analytics System 208 that analyzes search user behavior and provides advertisers with information that can help the advertisers determine the partial words that they can bid for related to the items they intend to advertise. As discussed above, there can be multiple slots for advertisements in the Advertisement space 103. In such a case, the determination of which advertisement to display in the multiple slots is performed sequentially on a slot by slot basis in an order determined by the system.

Figure 3:
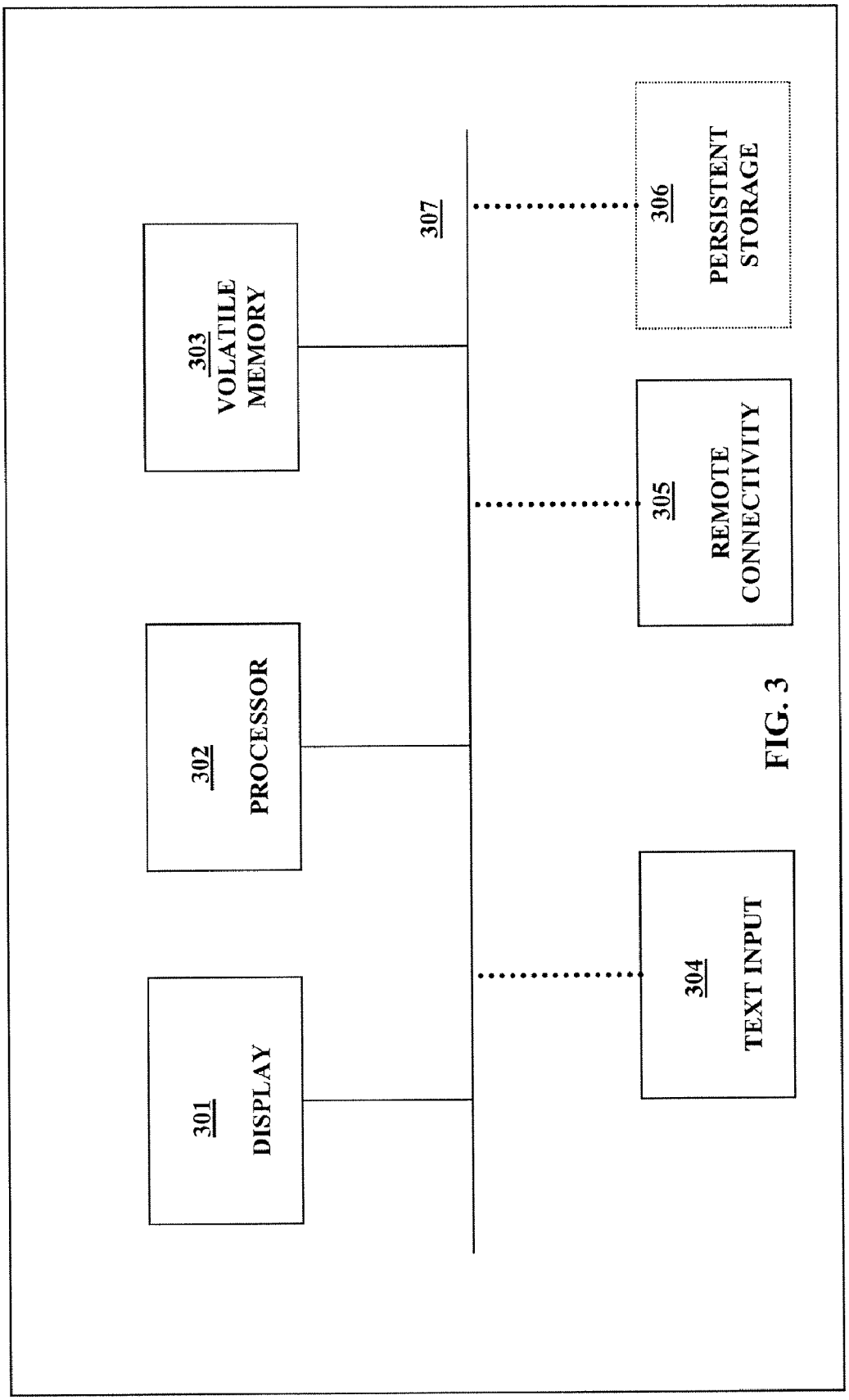
FIG. 3 illustrates a user device configuration to perform incremental search and display of advertisements.

FIG. 3 illustrates multiple exemplary configurations for search devices in accordance with one or more embodiments of the invention. In one configuration, a search device such as the PC 207 can have a display 301, a processor 302, volatile memory 303, text input interface 304 (which can be on-device or through a wireless remote control 206b), remote connectivity 305 to the Search Server 202 through the network 204, and persistent storage 306. A configuration for a device such as the hand-held device 205 might not include local persistent storage 306. In this case, the hand-held device 205 can have remote connectivity 305 to submit the search query to, and retrieve the search results from, the Search Server 202. A configuration for a device such as the television 206a can include remote connectivity 305 and persistent storage 306. In this case, the device can use the remote connectivity 305 for search relevance data or for updates where the search database is distributed on the local persistent storage 306 and on the Search Server 202. The most suitable configuration for a memory constrained device is having the search data residing remotely on a server.

Figure 4:
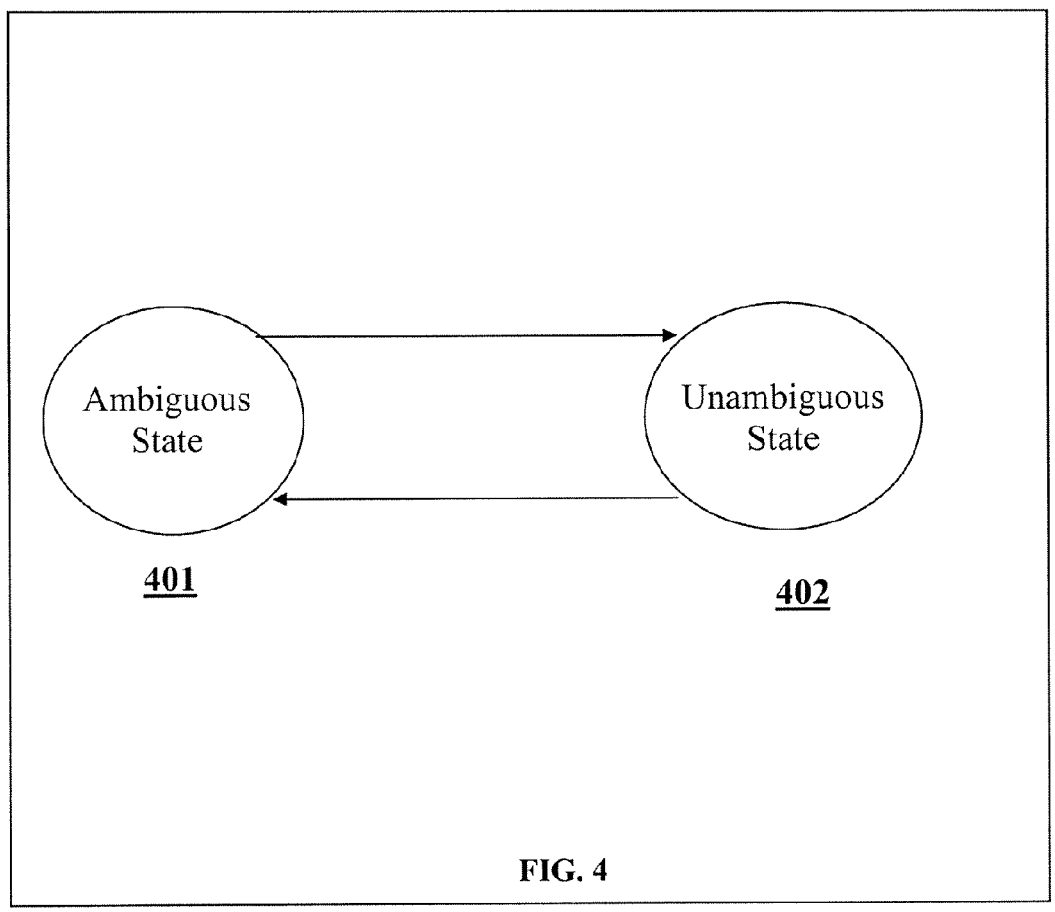
FIG. 4 illustrates the two states in which the user search session can be in the advertisement system presented in this invention.

Referring to FIG. 4, depending on the search string entered, the state of the search session of the user in a search system implementing incremental search can be in one of two states: the Ambiguous state 401 or the Unambiguous state 402. The Advertisement Bidding System 203 allows the advertisers or their agents to place bids for advertisements in the Ambiguous state 401 and bids for advertisements in the Unambiguous state 402. As mentioned above, for each search, the bid that is evaluated to be the one that is expected to generate the maximum economic utility to the entity supplying the search service is considered the winning bid. The corresponding advertisement is served by the Ad Server system 201 for display to the user in Advertisement space 103.

The search session is in the Unambiguous state 402 if any one of the following conditions is satisfied: (1) the text in the Search Box 101 is a valid full word; (2) the text in the Search Box 101 is not a valid full word, that is, it is only a partial word, and there is a bid for that partial word in the Advertisement Bidding System 203; or (3) the user is within at least one Fold 107, as explained above, or has selected an item on the Results Shelf 102. The search session is in the Ambiguous state 401 if none of the conditions to be satisfied for being in the Unambiguous state 402 listed above are satisfied. In addition, when the user has not entered any text into the Search Box 101, the search session is in the Ambiguous state 401.

Figure 5:
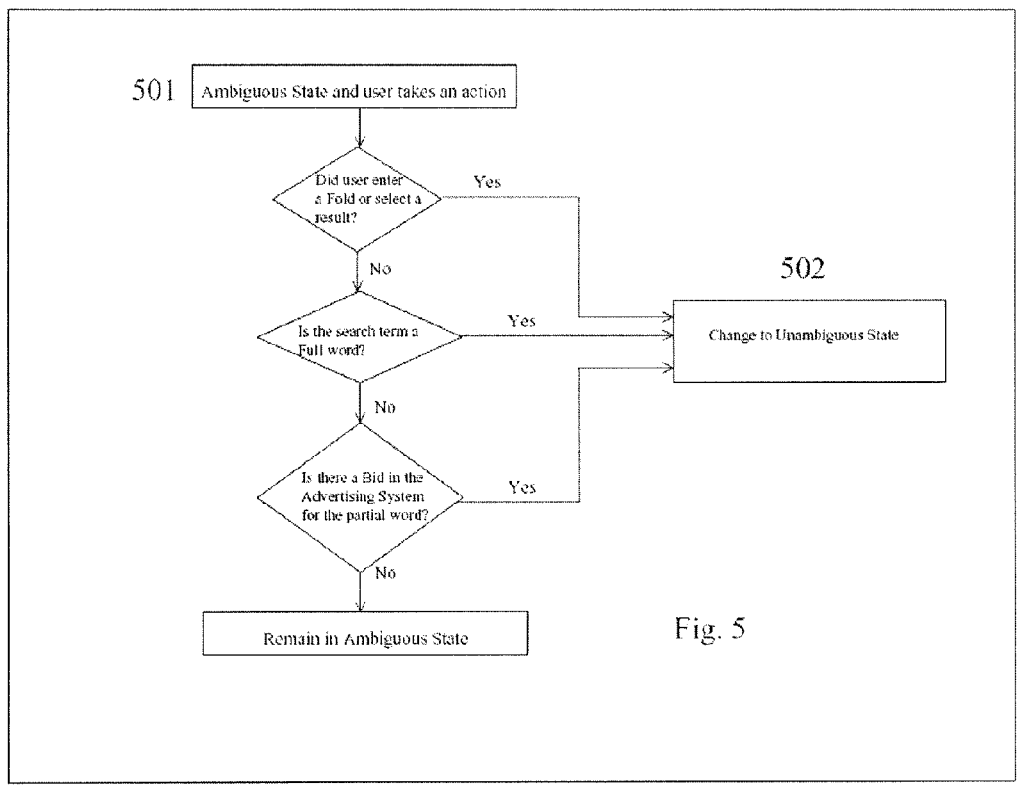
FIG. 5 illustrates the state transition logic when starting from the Ambiguous state.

Referring to FIG. 5, when the search session is in the Ambiguous state 501 and the user takes an explicit action, such as selecting an entry in the Results Shelf 102 or entering a Fold 107, the state of the search session is moved to the Unambiguous state 502. For example, in the Results Shelf 105, if the user selects the Fold "Pizza . . . More" 107, then the search session is moved to Unambiguous state 502.

When the search session is in the Ambiguous state 501 and the user enters another character into the Search Box 101, a determination is made if the text currently in the Search Box 101, including the just entered character, is a valid full word. If the text in the Search Box 101 including the newly entered character is a full word, the state of the search session is moved to the Unambiguous state 502. For example, if the text currently in the Search Box 101 is "pizz" and the user enters the character "a", the text in the Search Box 101 will become "pizza", which is a valid word. Hence, the search session is moved to Unambiguous state 502. The rules determining what combination of characters constitute valid full words is dependent on the system implementing the search and can vary from system to system based on a variety of factors, including but not limited to the data domains on which the search is performed.

If, after a character is entered, the text in the Search Box 101 is not a valid full word but a partial word, the search session is retained in the Ambiguous state 401. However, if there is a bid in the Advertisement Bidding System 203 for that partial word, the state of the search session is moved to the Unambiguous state 502. For example, when there is no text currently in the text box and the user enters the character "p", if there are no bids for "p" in the Advertisement Bidding System 203, the state is retained in Ambiguous state 501.

However, if there is a bid for "p" in the Advertisement Bidding System 203, then the search session is moved to the Unambiguous state 502.

Figure 6:
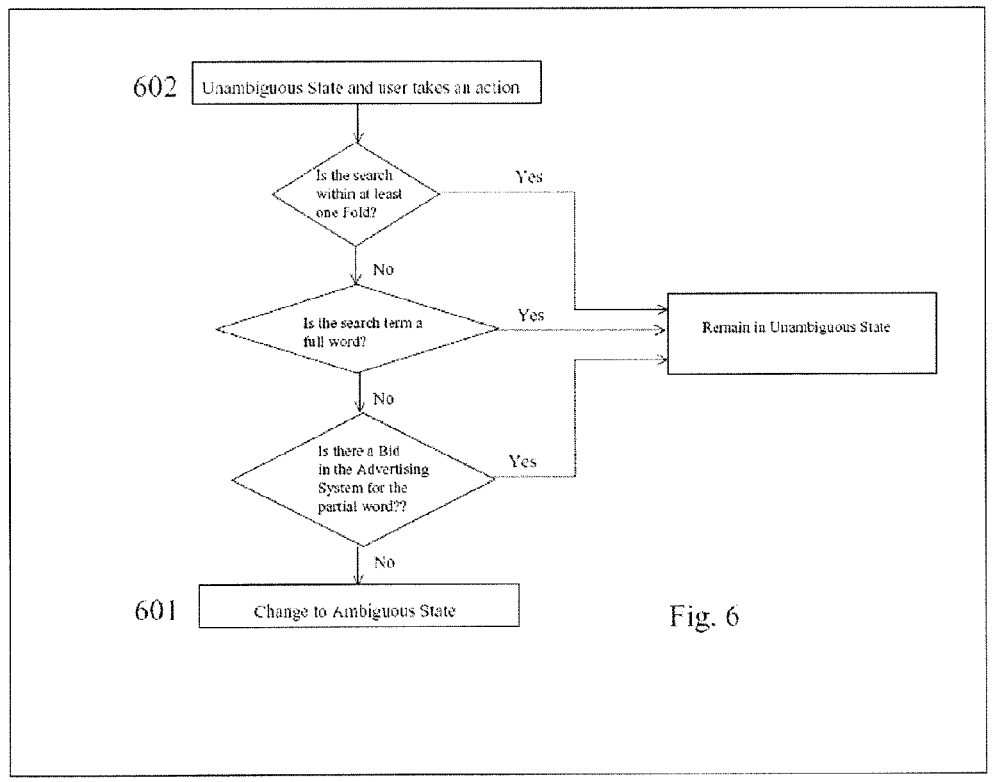
FIG. 6 illustrates the state transition logic when starting from the Unambiguous state.

Referring to FIG. 6, when the search session is in the Unambiguous state 602 and the user is within at least one Fold, the search session is retained in the Unambiguous state 602 until the user exits all Folds. Upon the user exiting, the Search Box 101 is evaluated again, to see if the conditions for being in the Unambiguous state 601 are satisfied. If the conditions for being in Unambiguous state 602 continue to be satisfied, the search session is retained in the Unambiguous state 602, otherwise search session is moved to Ambiguous state 601. As an example, consider that the user is within the Fold "Pizza . . . More" 107, which he had selected after seeing the Results Shelf 105 after entering "pi" in the Search Box 104. When the user exits this fold, the text in the Search Box 104 will be "pi". If there is no bid for "pi", the search session will be moved to Ambiguous state 601.

If the search session is in the Unambiguous state 602, but not within any fold, and the user takes an action, such as deleting a character or enters one more character, then the text in the Search Box 101 is evaluated again, to see if the conditions for being in Unambiguous state 602 continue to be satisfied. If conditions for being in the Unambiguous state 602 are satisfied, the search session is retained in the Unambiguous state 602, otherwise it is moved to the Ambiguous state 401. As an example, if the current text in the Search Box 101 is "pizza". This being a valid word, the search session is in the Unambiguous state 602. If the user deletes the "a" at the end, and the partial word "pizz" has no bid on it, the search session is moved to the Ambiguous state 601.

As noted above, competing bids are evaluated by the Advertisement Bidding System 203 and the bid that is expected to generate the maximum economic utility to the entity supplying the search service is considered the winning bid. A variety of criteria are used to determine which of the competing bids have the maximum expected economic utility to the entity supplying the search service. An example of such criteria could be based on the likelihood of the advertisement being acted upon by the individual user viewing the advertisement. For the Ambiguous state 401, this can involve factors including, but not limited to, the appearance of specific terms in the Results Shelf 105 and the relationship of the advertisement to those terms. For example, if the term "Pilates" appears on the Results Shelf 105 while in the Ambiguous state 401, then an advertisement related to Pilates may be deemed as likely to generate the maximum economic utility since the user is likely to call the advertiser and hence generate a fee for the entity providing the search.

Other factors that can be used to determine the winning bid are specific to the user of the search service at that point in time. This includes, but is not limited to, knowledge derived from the observed past behavior of the current user of the search. For example, while in the Ambiguous state 401, if the user is known to have lunch around the time the search is performed, then an advertisement for food may be determined to be the one that has a higher probability of being acted upon and therefore is expected to generate the maximum economic utility. Likewise, while in the Unambiguous state 402, if the user has entered "pi" in the Search Box 104, and advertisements for Pilates and Pizza are competing using identical bids for the partial keyword "pi", and currently it is lunch time, the system can determine that there is a higher probability that the advertisement for Pizza is likely to be acted upon by the user (thereby generating higher economic value for the entity providing search when there is a price for the action) and hence may determine that the winning bid is the one for Pizza. Techniques disclosed in the applications incorporated above are useful in learning the user's behavior and preferences.

In one preferred embodiment of this invention, each advertisement bid has two components: one component for displaying the advertisement in the Advertisement space 103 (called an Impression) and a second component for actions performed by the user associated with the advertisement (called an Action). As an example, a pizza vendor could bid $1 for displaying "Pizza Hall: Call 555 1212" in the Advertisement space 103 and $0.50 for an action performed by the user on seeing the advertisement, such as clicking on the advertisement to call the number 555 1212. The action can be one of many other possibilities as well, such as for example, viewing a short video commercial or viewing the web site of the advertiser. In such an embodiment, the bid that is expected to generate the maximum economic utility is determined by taking into account the bids for the Impression, the probability that the user will perform the associated action, and the bids for the Action. The probability that the user will perform the associated action can be determined by taking into account a variety of factors, some of them generic factors (for example, related to the advertisement, actions of the some or all of the search users, etc.) and some other factors that take into account aspects related to the specific user of the search.

In one preferred embodiment of this invention the advertisement to be displayed to the user on an available advertisement slot in the Advertisement space 103 is determined based on which state the search session is in. The Advertisement Bidding System 203 allows the advertisers or their agents to place bids into two separate and distinct categories: bids for advertisement in the Ambiguous state 401 and bids for advertisement in the Unambiguous state 402. The Advertisement Bidding System 203 also allows bids for the Ambiguous state 401 to describe or specify the characteristics of the associated advertisement with the objective of enabling the system to determine the best advertisement to be displayed for a given available advertisement slot. Bids for the Unambiguous state 402 must also specify one or more texts associated with the bid. Such text can be not only full words, such as "pizza", but also partial prefixes of words, such as, in the case of pizza, "p", "pi", "piz", or "pizz".

When the search session is in the Ambiguous state 401, all bids for the Ambiguous state 401 are evaluated. The bid that is evaluated to be the one that is expected to generate the maximum economic utility to the entity supplying the search service is considered the winning bid, and the corresponding advertisement is served by the Ad Server system 201 for display to the user in Advertisement space 103.

When the search session is in the Unambiguous state 402, all bids for the Unambiguous state 402 that have a perfect match of text corresponding to the bid with the words or partial words of text in the Search Box 101 as well as with the label(s) of the results or Fold(s) 107 are evaluated. Again, the bid that is evaluated to be the one that is expected to generate the maximum economic utility to the entity supplying the search service is considered the winning bid, and the corresponding advertisement is served by the Ad Server system 201 for display to the user in Advertisement space 103.

When the search session is in the Unambiguous state 402, but there are no bids available in the Advertisement Bidding system corresponding to any of the text entered in the Search Box 101 or the label(s) of results or Fold(s) 107 entered by the user, then the bids, if any, available for the Ambiguous state 401 are evaluated. For example, when the user is in the Unambiguous state 402 due to being in a Fold that is labeled as "Tom Cruise" and there are no bids for "Tom Cruise", bids, if any, available for the Ambiguous state are evaluated and the bid that has the maximum expected economic utility to the entity supplying the search service is selected and displayed. In this case, if the search string was "br", an advertisement for a DVD starring Brad Pitt may be determined to be the one that is expected to generate the maximum economic value because Tom Cruise and Brad Pitt are related to the overall concept of movies. Thus, there is a high likelihood of the user buying the DVD as the search session is in the Unambiguous state 402 due to being in a fold that is labeled as "Tom Cruise", possibly indicating a desire to purchase a DVD, and the search string contains "br", which is potentially a search for Brad Pitt. Techniques disclosed in U.S. Provisional Patent Application No. 60/825,616, entitled A Method Of Dynamically Generating Hierarchically Organized Result Clusters For An Incremental Search Query Matching One Or More Precomputed Hierarchical Clusters, filed Sep. 14, 2006, can be used with the techniques described herein. That application taught ways of generating search results based on combining concepts associated with incremental search results. Thus, those techniques can be used with the methods disclosed herein to determine which advertisements may be of interest the user by comparing concepts related to the search results and concepts related to the advertisements.

In one preferred embodiment of this invention, the Analytics System 208 provides information to advertisers on partial words entered by users in searches and the eventual selection of result items on the Results Shelf 102 in those searches. This can be used by advertisers to decide which partial words they can bid for in order to promote the items they intend to advertise. For example, if a large proportion of users who entered the partial word "pi" chose "Pizza", then a pizza vendor would consider bidding for the partial word "pi".

Input Incompleteness and Errors on Unambiguous and Ambiguous Keypads

Embodiments of the invention enable a user to perform searches using incomplete and/or incorrect input on an unambiguous keypad. On an unambiguous keypad, the user inputs text alphabets directly and can be aided by a query composition system to complete the full query even when the input is incomplete or erroneous relative to the full query. In the incomplete input case, the user's input process may have one or more of the following characteristics: The user may only input a prefix of the full query, or may omit one or more of the words constituting the full query, or may input only prefixes of one or more of the words constituting the full query. In the erroneous input case, the user's input process may have one or more of the following characteristics: The user may misspell one or more of the words constituting the full query or may input one or more extra words relative to the full query, or may swap one or more words relative to the full query. Additionally, the user's input process may also have one or more characteristics of the incomplete input case combined with one or more characteristics of the erroneous input case.

On an ambiguous keypad, there is a unique 'ambiguous full query' corresponding to the disambiguated full query the user wants to search—that is, the full query maps to a unique numeric string on a numeric keypad. For example, if the disambiguated full query is the string "car crash", then the corresponding ambiguous full query on the standard numeric phone keypad is the string "227 27274". The strings "227" and "27274" can be said to be words constituting the ambiguous full query, and the string "2774" can be said to be a misspelling of the word "27274" that occurs when the user omits the third letter in the word. Similarly the string "272" can be said to be a three-letter prefix of the word "27274".

In the incomplete input case on ambiguous keypads, the user's input process may have one or more of the following characteristics: The user may only input a prefix of the ambiguous full query, or may omit one or more of the words constituting the ambiguous full query, or may input only prefixes of one or more of the words constituting the ambiguous full query. In the erroneous input case on ambiguous keypads, the user's input process may have one or more of the following characteristics: The user may misspell one or more of the words constituting the ambiguous full query or may input one or more extra words relative to the sequence of words constituting the ambiguous full query, or may swap one or more words relative to the correct sequence of words constituting the ambiguous full query. Additionally, the user's input process may also have one or more characteristics of the incomplete input case combined with one or more characteristics of the erroneous input case. Techniques disclosed in the applications incorporated above can be used to perform content searches based on input having errors.

Selecting and Providing Relevant Search Engines

Under another preferred embodiment of the invention, the search system offers to the user a dynamically computed list of search engines, selected from a database of search engines, that are likely to be particularly relevant to the user's query. In this context, any public website which has a search facility constitutes a search engine. For instance, when the refined query is related to entertainment, the recommended search engine will be a site with a search facility that is specifically targeted to entertainment, e.g. a link to the Internet Movie Database or Allmusic Search. On the other hand, when the refined query is such that the user may want to act upon it in by phoning in a reservation or booking tickets, the methods provide a website corresponding to the likely activity or a Local/Yellow Pages search engine.

If the suggested refinements and the provided search engine links fail to accurately predict the user's intent, he may then manually complete his query and launch it in a default, general-purpose search engine to obtain the widest set of search results. Thus, embodiments of the prevent invention are able to provide narrowly targeted search results without sacrificing the breadth of general-purpose search systems.

Determining the general category to which the search query relates (e.g. entertainment) and selecting search engines relevant to this category is accomplished according to the techniques described in the references listed above. For example, one preferred embodiment might use a computer database to associate both search engines and query refinements with a set of subject matter categories. When the user types "psyc" into the search field, a suggested query refinement might be "psychiatry," which is associated in a computer database with the "Medicine" category. If the WebMD search engine is also associated with this category, the search system might provide a link that will launch the query "psychiatry" in the WebMD search engine.

Providing relevant search engines incrementally improves both the accuracy and efficiency of search systems. Users are more likely to obtain the best results from a search engine that specializes in the subject matter of the user's query. For example, the query refinement "Mansfield Park" might be associated with both the "Books" and the "Movies" categories, since it can refer either to a $19^{th}$ century novel or to a movie that was released in 1999. The system could then provide links to search for "Mansfield Park" on both Google Books Search and the Internet Movie Database, which are likely to provide more relevant results for books and movies, respectively, than a general-purpose search engine would provide. Also, because the system can project possible refinements from incomplete and ambiguous queries, these results can be displayed without requiring the user to type the full query. Minimal text entry improves efficiency in general, and particularly on input-constrained devices such as mobile phones or PDAs.

In preferred embodiments, the search engines are provided to the user as links, or other selectable objects, that will directly launch the desired query string in the selected search engine. In general, such links are generated by embedding the query string into a search engine Uniform Resource Locator (URL). For example, the following URL may be used to launch a search for the query string "Casablanca" on the imdb.com search engine:

http://www.imdb.com/
find?s=all&q=casablanca&x=0&y=0

The word "Casablanca" is included in the above URL as a parameter, indicating to the imdb.com search engine that it should perform a search for the word "Casablanca" and return the results.

The format of such URLs differs across search engines. Thus, each search engine in the system is associated with a "template" URL which indicates where and how the query string must be inserted in the search engine URL to generate the desired link. For example, in one particular embodiment, the template URL associated with imdb.com might be:

http://www.imdb.com/
find?s=all&q=QUERY_STRING_HERE&x=0&y=0

The search system will retrieve this template URL and generate the desired link by replacing the string "QUERY_STRING_HERE" with the desired query string.

Figure 7:
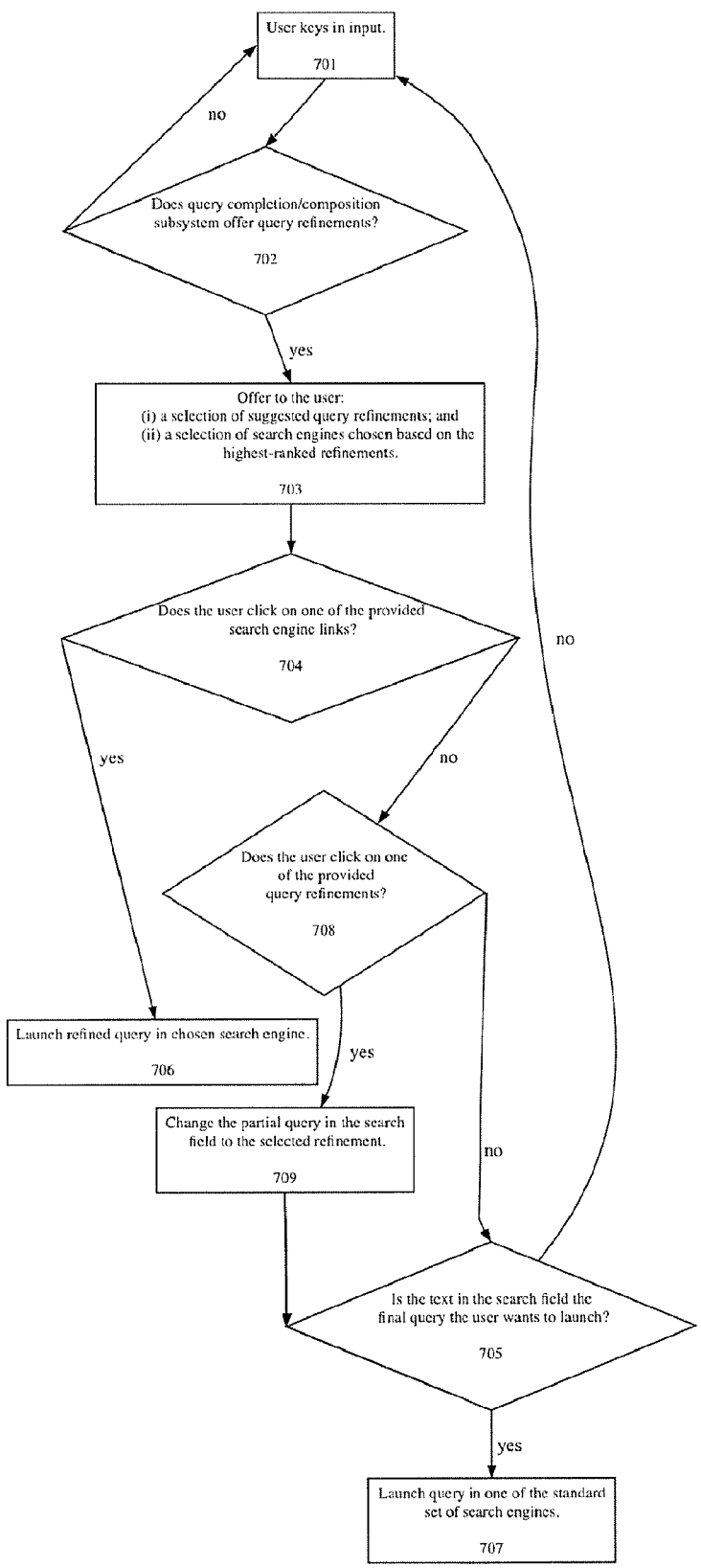
FIG. 7 illustrates the operation of a system that offers relevant search engine links at each refinement point.

FIG. 7 illustrates the operation of one preferred embodiment that provides the user with a selection of relevant search engine results at each refinement point, i.e., whenever suggested query refinements are available. The user begins to enter text into the search field 701 until the system reaches a refinement point 702. The text entered by the user may be ambiguous text that is entered using an input-constrained device. At this time, the system offers to the user a selection of suggested query refinements that are likely to be relevant to the partial query 703. As described by the incorporated references, this may be accomplished by matching the partial query to items in the "main database" and/or the information contained in "folds." Also, the system may match input to metadata associated with database items.

As an example, consider the partial user query "vic cir." Using standard dictionary prefixing, this might be expanded to the refined query "vicious circle." The phrase "vicious circle" is the title of a stand-up comedy performance by comedian Dane Cook, and therefore might be associated with the metadata category "dane cook." By this process of metadata matching, the string "dane cook" is returned as a possible query refinement for the initial partial query "vic cir."

At this stage, the system also selects a set of relevant search engines based on each of the most highly-ranked query refinements and provides this list to the user. The techniques used to rank the various query refinements are described in greater detail in the above references. Each one of these search-engine links is associated with one of the provided query refinements. One preferred embodiment might use "topical" metadata associations in the database to select these search engines. For example, the category "dane cook" could be associated with topical metadata such as "comedy," "standup", "TV", "moves", "entertainment", etc. Search engines are also associated with topical metadata categories—for example WebMD with "medicine", IMDB with "movies", etc. The system will compile a list of topical metadata categories associated with a refined query string, and then select search engines whose topical metadata categories overlap with this list. With the above example, the IMDB search engine would be selected (among others), since both "dane cook" and IMDB are associated with the topical metadata category "movies."

If the user clicks on one of the provided search engine links 704, then the associated query refinement is passed to the selected search engine and a search is performed. Otherwise, if the user selects one of the provided query refinements 708, the text in the search field is changed to the selected refinement 709. Finally, the user may either launch the refined query in the default search engine 705, 707, or enter more input in the search field 701. The process of fetching results in the default search engine is detailed in the references incorporated above. The default search engine may, for example, use metadata-matching techniques to obtain the most relevant results.

Figure 8:
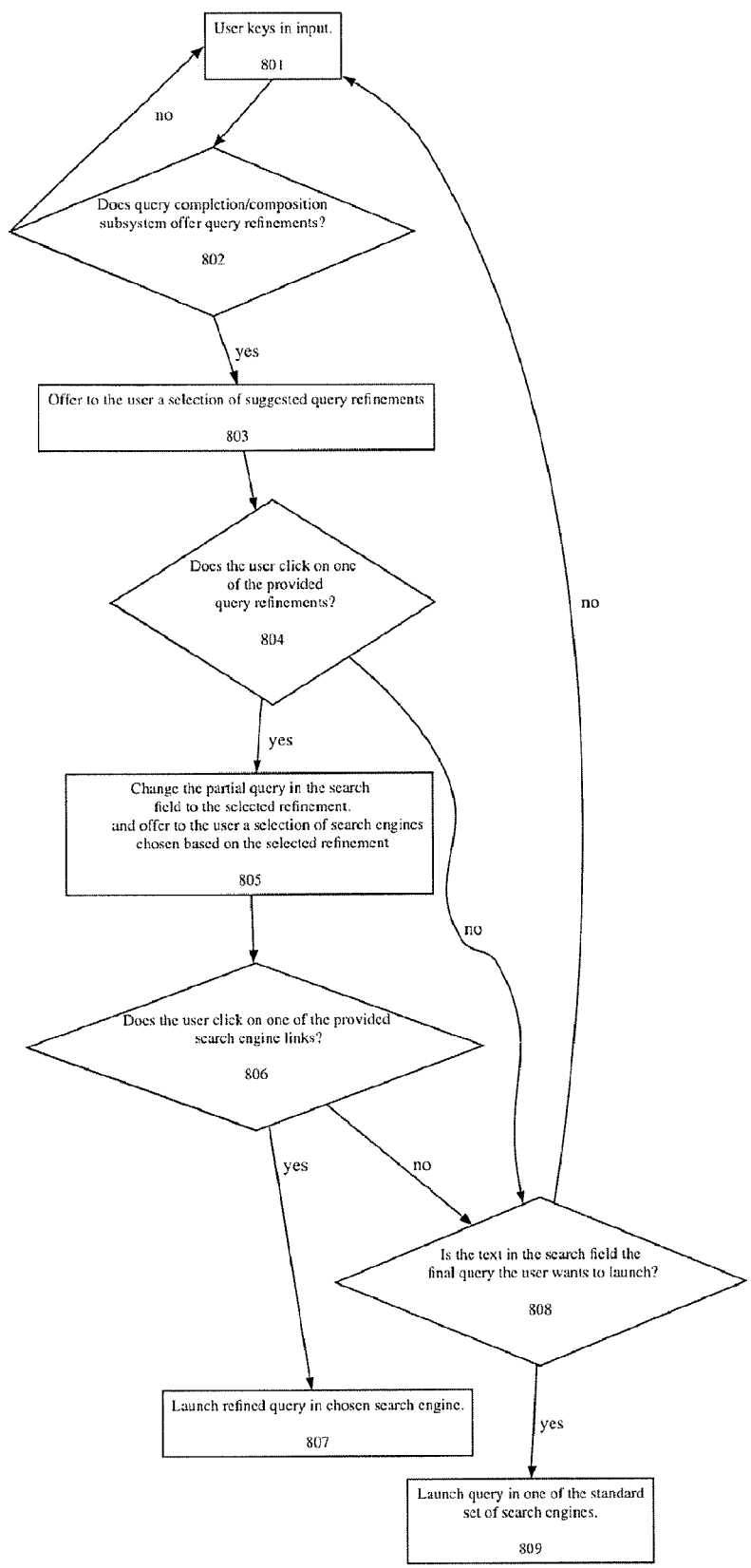
FIG. 8 illustrates the operation of a system that offers relevant search engine links at each selection point.

FIG. 8 illustrates the operation of another preferred embodiment, in which the selection and presentation of search engines is only performed at each selection point, i.e., when the user selects a query refinement. In this method, the user begins to enter text into the search field 801 until the system is able to use the partial query string to select a list of suggested query refinements 802. At this refinement point, the system offers to the user a selection of suggested query refinements 803. The system uses the techniques described and incorporated above to determine the most appropriate refinements and rank them according to relevance. If the user selects one of the refinements 804, the system computes and provides a selection of search engine links based upon the selected refinement 805. Although techniques similar to those described above are used to determine the most appropriate search engines for the given refinement, this implementation differs in that the refinement is not incremental input, nor is it ambiguous input. Thus, the topical breadth covered by the suggested search engines is narrowly tailored to the unambiguous text of the refinement. At this point, the user has three options: first, he may choose to launch the refined query in one of the suggested search engines 807; second, he may choose to launch the refined query in the default search engine 809; finally, he may choose to further refine the query by keying in more input 801.

Figure 9:
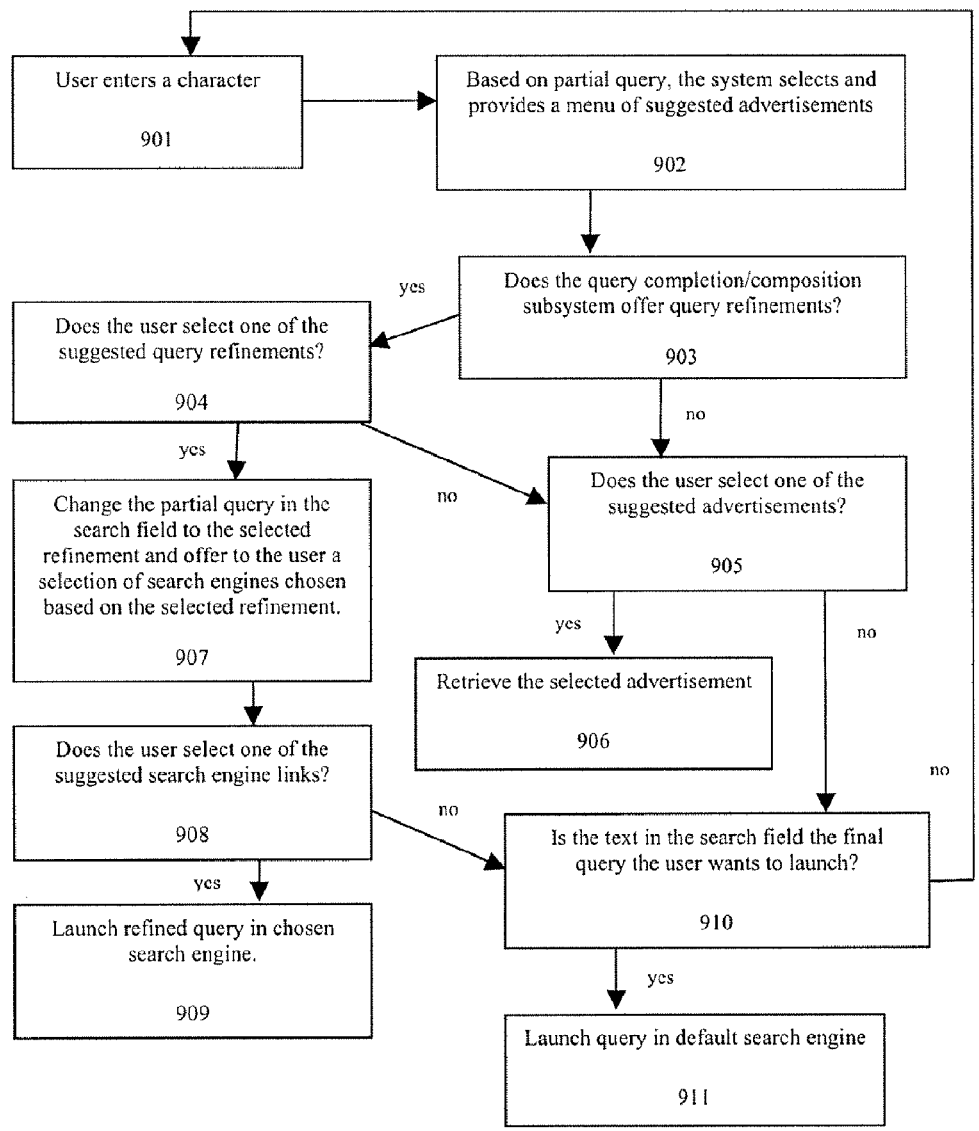
FIG. 9 illustrates the operation of a system that offers relevant search engine links at each selection point, and also offers incremental search and display of advertisements.

FIG. 9 illustrates the operation of another preferred embodiment, in which the searching system selects relevant search engines at each selection point and also provides incremental advertisements as described in the previous sections. After each character entered by the user 901, the system computes and presents a list of relevant advertisements using, e.g., the metadata matching method described above, that matches advertisements and query refinements according to their associated topical categories 902. Also, if the system reaches a refinement point 903, it presents a set of suggested query refinements to the user. By selecting one of these queries 904, the user triggers a selection point, and the system will compute and provide a selection of search engine links based upon the selected refinement in accordance with the techniques discussed in connection with FIG. 8 907. The collection of advertisements presented to the user will at this point be filtered to contain only those advertisements that are relevant to the selected query refinement. Selecting one of the search engine links will launch the refined query in the selected search engine 908, 909. Alternatively, the user may select one of the suggested advertisements 905, 906. If none of the advertisements is selected, the user may launch the refined query in the default search engine 911, or further refine the original query entry by keying in more input 901.

Figure 10:
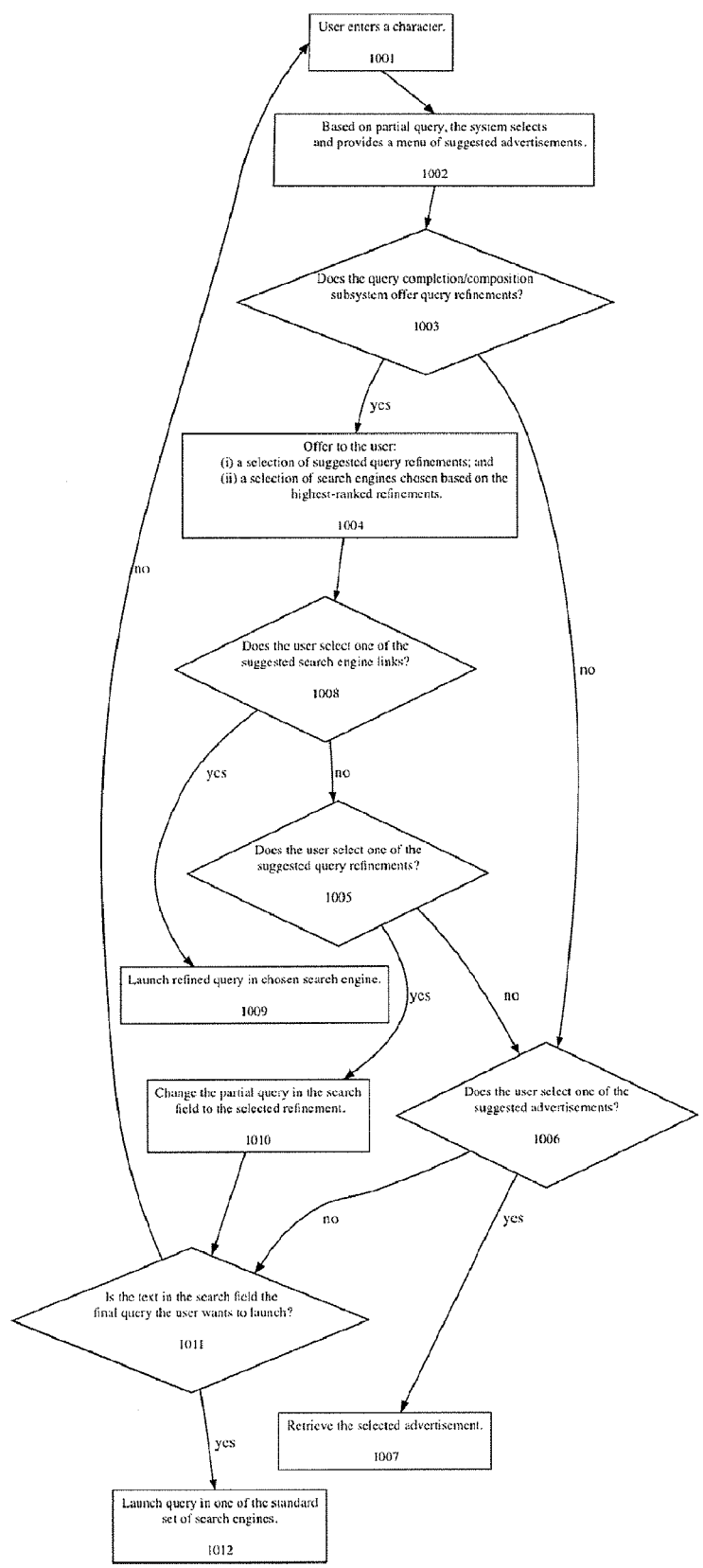
FIG. 10 illustrates the operation of a system that offers relevant search engine links at each refinement point, and also offers incremental search and display of advertisements.

FIG. 10 illustrates the operation of another preferred embodiment, in which the searching system selects relevant search engines at each refinement point (in accordance with the techniques described in connection with FIG. 7) and also provides incremental advertisements as described in the previous sections. After each character entered by the user 1001, the system computes and presents a list of relevant advertisements using the method described above 1002. Also, if the system reaches a refinement point 1003, it will display a menu of suggested query refinements 1004. At this stage, the system also selects a set of relevant search engines based on each of the most highly-ranked query refinements and provides this list to the user. Thus, both the relevant advertisements and suggested query refinements are based on the incremental, and potentially ambiguous, user character entries, while the suggested relevant search engines are based on the unambiguous suggested query refinements. If the user clicks on one of the provided search engine links 1008, then the associated query refinement is passed to the selected search engine and a search is performed 1009. Alternatively, the user may select one of the suggested advertisement links 1006, 1007. Alternatively, the user may select one of the suggested query refinements 1005, which will replace the partial query in the search field with the chosen refinement 1010. Finally, the user may launch the refined query in the default search engine 1012, or further refine the query by keying in more input 1001.

Figure 11:
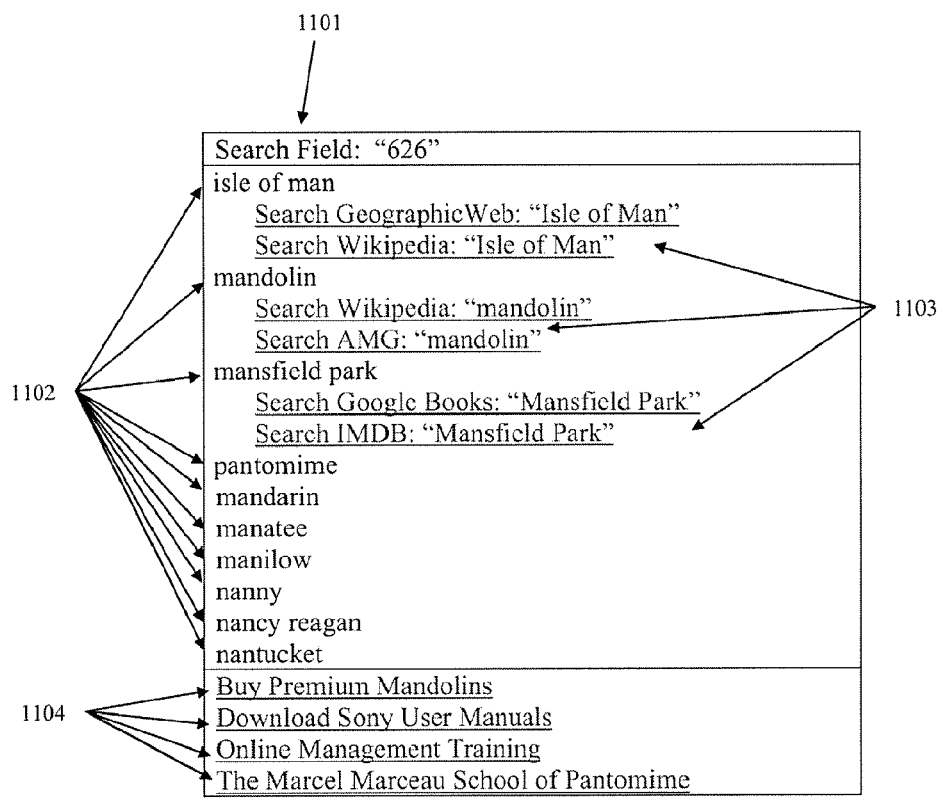
FIG. 11 illustrates an example of the type of information displayed to the user in an embodiment that provides both advertisements and search engine links.

FIG. 11 illustrates the types of information that might be displayed to the user by an embodiment that provides both advertisements and search engine links, such as that illustrated in FIG. 10. In this example, the user has entered an ambiguous query "626" into the search field, which, on a telephone keypad, might correspond to either of the prefixes "man" or "nan" 1101. Based on the "man" prefix, the system is able to select a list of suggested query refinements 1102, including "isle of man," "mandolin," "mansfield park," "mandarin," "manatee," and "manilow." Based on the "nan" previs, the system is able to suggest the query refinements "nantucket" "nanny" and "nancy reagan." Finally, the system may account for erroneous user entries by reducing both the input and the database entries into phonetic elements, which resist orthographic and typographic errors (as described in the application entitled System and Method for Finding Desired Results by Incremental Search Using and Ambiguous Keypad with the Input Containing Orthographic and Typographic Errors, referenced above). For example, the system might infer that the user intended to enter "pan," which corresponds to the query refinement "pantomime."

According to techniques described in the references listed above, these query refinements are ranked, and links to search engines that are relevant to each of the top-ranked refinements are displayed to the user 1103. For example, one preferred system implementing the disclosed techniques might monitor and record the past selections of users of the system, and use this information to bolster the relevance of suggested query refinements. For example, if the user had selected geographic links in the past, the query refinement "isle of man" would be promoted as the most relevant of the suggested refinements. Advertisements related to the current query string "man" are also displayed 1104. Selecting one of the search engine links will launch the refined query string in the selected search engine. For example, the link labeled 'Search Wikipedia: "mandolin"' is associated with a URL that will launch the Wikipedia search engine with the query string "mandolin."

The above example is an illustration of the functionality of a particular embodiment. The search engines and advertisements chosen are not genuine, but are intended only to convey a general understanding. Other embodiments and implementations might suggest different query refinements, search engines, and advertisements.

The embodiments described above select and launch relevant search engines according to a query refinement, and not the actual partial query in the search box. However, other embodiments of the invention select and launch relevant search engines according to the user's partial query.

Conclusion

Having described preferred embodiments of the present invention, it should be apparent that modifications can be made without departing from the spirit and scope of the invention. For example, the term "advertisements" has been used herein to describe commercial offerings. However, as used herein, the term "advertisements" also represents any form of information supplied to the user.

It will be appreciated that the scope of the present invention is not limited to the above described embodiments, but rather is defined by the appended claims; and that these claims will encompass modifications of and improvements to what has been described.

What is claimed is:

1. A user-interface method of incrementally providing fully qualified links to a set of relevant search engines, the method comprising:

identifying a set of search engines and associating each search engine of the set with at least one descriptive category to which the subject matter of the corresponding search engine relates;

providing a database containing a collection of potential full queries, each potential full query associated in said database with at least one descriptive category;

receiving a partial search query entered on a keypad by a user;

after each keypress received from the user, inferring a set of potential full queries intended by the user, based at least in part on the partial search query;

selecting a subset of the identified search engines that are relevant to the inferred full queries based on comparing the inferred full queries with the descriptive categories associated with the search engines, wherein the selecting the subset of relevant search engines is further based on the descriptive categories associated with the provided potential full queries; and for each of the selected search engines, providing a fully qualified link designed to directly launch a search for a relevant query string using the search engine.

2. The method of claim 1 further comprising presenting at least one of the inferred potential full queries to the user.

3. The method of claim 1 further comprising presenting at least one of the fully qualified links to the user.

4. The method of claim 1 further comprising estimating the degree to which each of the inferred potential full queries is relevant to the partial search query entered by the user.

5. The method of claim 1 further comprising learning user preferences by analyzing previous user input, and inferring the potential full queries according to said learned user preferences.

6. The method of claim 1 wherein the keypad includes overloaded keys in which each overloaded key corresponds to more than one alphanumeric character.

7. The method of claim 6 wherein the partial search query contains ambiguous text.

8. The method of claim 1 wherein the partial search query contains potentially erroneous data.

9. The method of claim 1 wherein the relevant query string is the partial search query entered by the user.

10. The method of claim 1 wherein the relevant query string is one of the provided query refinements.

11. A user-interface system for incrementally providing fully qualified links to a set of relevant search engines, the system comprising:
   computer memory comprising instructions in computer readable form that when executed cause a computer system to:
      identify a set of search engines and associate each search engine of the set with at least one descriptive category to which the subject matter of the corresponding search engine relates;
      provide access to a database containing a collection of potential full queries, each potential full query associated in said database with at least one descriptive category;
      receive a partial search query entered on a keypad by a user;
      infer, after each keypress received from the user, a set of potential full queries intended by the user, based at least in part on the partial search query;
      select a subset of the identified search engines that are relevant to the inferred full queries based on comparing the inferred full queries with the descriptive categories associated with the search engines, wherein the selecting the subset of relevant search engines is further based on the descriptive categories associated with the provided potential full queries; and
      provide, for each of the selected search engines, a fully qualified link designed to directly launch a search for a relevant query string using the search engine.

12. The system of claim 11, the computer memory further comprising instructions that cause the computer system to present at least one of the inferred potential full queries to the user.

13. The system of claim 11, the computer memory further comprising instructions that cause the computer system to present at least one of the fully qualified links to the user.

14. The system of claim 11, the computer memory further comprising instructions that cause the computer system to estimate the degree to which each of the inferred potential full queries is relevant to the partial search query entered by the user.

15. The system of claim 11, the computer memory further comprising instructions that cause the computer system to learn user preferences by analyzing previous user input, and infer the potential full queries according to said learned user preferences.

16. The system of claim 11 wherein the keypad includes overloaded keys in which each overloaded key corresponds to more than one alphanumeric character.

17. The system of claim 11 wherein the partial search query contains ambiguous text.

18. The system of claim 11 wherein the partial search query contains potentially erroneous data.

19. The system of claim 11 wherein the relevant query string is the partial search query entered by the user.

20. The system of claim 11 wherein the relevant query string is one of the provided query refinements.

* * * * *